United States Patent [19]

Krummheuer et al.

[11] Patent Number: 5,356,680
[45] Date of Patent: Oct. 18, 1994

[54] INDUSTRIAL FABRICS OF CONTROLLED AIR PERMEABILITY AND HIGH AGEING RESISTANCE AND MANUFACTURE THEREOF

[75] Inventors: Wolf R. Krummheuer, Wuppertal; Hans A. Graefe, Schwelm; Volker Siejak, Duisburg, all of Fed. Rep. of Germany

[73] Assignee: Akzo N.V., Arnhem, Netherlands

[21] Appl. No.: 913,728

[22] Filed: Jul. 16, 1992

[30] Foreign Application Priority Data

Jul. 16, 1991 [DE] Fed. Rep. of Germany ....... 4123537
Jun. 13, 1992 [DE] Fed. Rep. of Germany ....... 4219386

[51] Int. Cl.$^5$ ............................................. B29D 22/00
[52] U.S. Cl. .................................... 428/36.1; 28/167; 139/420 A; 139/420 R; 280/728 R; 428/225
[58] Field of Search .............................. 428/225, 36.1; 139/420 A, 420 R; 28/167; 280/728; 34/23

[56] References Cited

U.S. PATENT DOCUMENTS

| | | |
|---|---|---|
| 1,269,340 | 6/1918 | Vanderkleed et al. . |
| 2,267,117 | 12/1941 | Mann et al. . |
| 2,276,605 | 3/1942 | Andrews . |
| 2,365,931 | 12/1944 | Benger . |
| 2,377,434 | 6/1945 | Lyem . |
| 2,916,348 | 12/1959 | Cresswell . |
| 3,166,824 | 1/1965 | Fuhr . |
| 3,228,745 | 1/1966 | Galatioto . |
| 3,235,932 | 2/1966 | Jones . |
| 3,695,064 | 10/1972 | Runton . |
| 3,799,574 | 3/1974 | Bonn et al. . |
| 3,842,583 | 10/1974 | Gage . |
| 3,862,822 | 1/1975 | Schiffer . |
| 3,888,504 | 6/1975 | Bonn et al. . |
| 3,915,632 | 10/1975 | Troope et al. . |
| 3,978,696 | 9/1976 | Ito et al. . |
| 4,559,975 | 12/1985 | Stits . |
| 4,590,121 | 5/1986 | Mahr . |
| 4,840,397 | 6/1989 | Katz et al. . |
| 4,921,735 | 5/1990 | Bloch . |
| 4,945,952 | 8/1990 | Vohringer . |
| 4,977,016 | 12/1990 | Thornton et al. . |
| 5,010,663 | 4/1991 | Thornton et al. . |
| 5,093,163 | 3/1992 | Krummheuer et al. . |

FOREIGN PATENT DOCUMENTS

| | | |
|---|---|---|
| 974745 | 9/1975 | Canada . |
| 2034067 | 7/1991 | Canada . |
| 0314867 | 5/1989 | European Pat. Off. . |
| 0336507 | 10/1989 | European Pat. Off. . |
| 0416483 | 3/1991 | European Pat. Off. . |
| 0436950 | 7/1991 | European Pat. Off. . |
| 0442373 | 8/1991 | European Pat. Off. . |
| 0453678 | 10/1991 | European Pat. Off. . |
| 2122704 | 11/1971 | Fed. Rep. of Germany . |
| 2164627 | 7/1972 | Fed. Rep. of Germany . |
| 3015607 | 11/1981 | Fed. Rep. of Germany . |
| 8714595 | 1/1988 | Fed. Rep. of Germany . |
| 3644554 | 4/1988 | Fed. Rep. of Germany . |
| 3705345 | 9/1988 | Fed. Rep. of Germany . |
| 4004216 | 8/1991 | Fed. Rep. of Germany . |
| 4009611 | 10/1991 | Fed. Rep. of Germany . |
| 80880 | 2/1970 | German Democratic Rep. . |
| 59-204967 | 11/1984 | Japan . |
| 3167312 | 7/1991 | Japan . |
| 1318687 | 5/1973 | United Kingdom . |
| 1444057 | 7/1976 | United Kingdom . |
| 2074205 | 10/1981 | United Kingdom . |

OTHER PUBLICATIONS

Dr. W. Albrecht, "Über die Eigenschaften der Diolen-Hochschrumpffasern", *Chemiefasern*, 1968, pp. 746-751.

F. Fourne, "Erfahrungen beim Heissfixieren vollsynthetischer Fasern", *Textil-Praxis*, 1953, pp. 795-800.

Primary Examiner—James J. Bell
Attorney, Agent, or Firm—Oliff & Berridge

[57] ABSTRACT

Industrial fabrics have controlled air permeability <120 $1/dm^2 \times$ min and a very good ageing resistance. The air permeability value does not change by more than 15% in the ageing test. This fabric can be made by adapting production conditions for weaving, wet processing, and in particular, hot air treatment. The process is particularly suited for manufacturing air bag fabrics.

27 Claims, No Drawings

INDUSTRIAL FABRICS OF CONTROLLED AIR PERMEABILITY AND HIGH AGEING RESISTANCE AND MANUFACTURE THEREOF

FIELD OF THE INVENTION

The invention concerns industrial fabrics of controlled air permeability $<120$ $l/dm^2 \times min$, measured under a test pressure difference of 500 Pa, and a process for manufacturing the same.

BACKGROUND OF THE INVENTION

For many uses of industrial fabrics, it is crucial for them to possess a controlled air permeability. Examples are fabrics on the underside of parachutes, fabrics for gas filtration, fabrics for manufacturing landing pads, etc.

This is particularly true of air bag fabrics. Air bags usually consist of two fabrics which differ in air permeability. The contact part, which faces the vehicle occupant at the instant of deployment of the air bag, is required to have an extremely low air permeability of $<10$ $l/dm^2 \times min$ under a test pressure difference of 500 Pa. It is this fabric which traps the generator-produced gas and causes the air bag to inflate.

However, soft cushioning of the vehicle occupant in the event of the vehicle being involved in a collision is possible only if care has been taken to ensure that some of the gas will be able to escape from the air bag under the impact of the vehicle occupant. For this reason, air bags are made either of single-piece fabrics of varying air permeability or from two sewn-together fabrics whose air permeabilities differ in a controlled way. Such air bags then consist of the above-mentioned so-called contact fabric of very low air permeability and a so-called filter fabric of significantly higher air permeability, permitting controlled escape of the generator gas. The filter fabric usually forms the side parts of the air bag. A filter fabric is required to have air permeabilities ranging between 20–120 $l/dm^2 \times min$, measured under a test pressure difference of 500 Pa.

Any material employed in an injury prevention function must, as an absolute requirement, retain its original properties over a prolonged period even under extreme conditions. This requirement particularly applies to air bags, which are intended to protect the vehicle occupants in the event of an accident. For instance, the original air permeability, not only of the contact fabric but also of the filter fabric of an air bag, must remain unchanged if at anytime, and even following an extended period of using the vehicle, protection of the occupants in the event of an accident is to be ensured. If the air permeability of a fabric remains unchanged over a long period, even under extreme conditions, the fabric will normally be said to possess ageing resistance.

Similar to filter fabrics for an air bag, other industrial fabrics having controlled air permeability must meet a maximum ageing resistance requirement, in particular, if they are used to prevent injury. This requirement is also absolutely essential for the above-mentioned fabrics for use in parachutes, for landing pads, etc.

To manufacture contact fabrics for air bags or industrial fabrics which are subject to similar low air permeability requirements, it is possible to employ a process described in EP-A-436,950, which makes it possible to achieve the required low air permeability. This process can also be employed for air bag filter fabrics, which must have a distinctly high air permeability when compared with contact fabrics. This reference does not disclose which process parameters must be observed in order to ensure a high ageing resistance in respect of the original air permeability. The process described in EP-A-436,950 is suitable only for fabrics made of polyamide yarns.

SUMMARY OF THE INVENTION

An object of the present invention is to provide a congeneric industrial fabric which enhances user safety and a process for manufacturing the same and is achieved in a fabric and in a process for manufacturing the same according to the invention.

Surprisingly, industrial fabrics of controlled air permeability coupled with high ageing resistance can be manufactured if the production conditions in weaving, in wet processing and in drying are precisely adapted to one another, and in particular, the cooling and winding conditions after drying are very accurately controlled, as described with respect to preferred embodiments.

DETAILED DESCRIPTION OF PREFERRED EMBODIMENTS

Air bag fabrics and other industrial fabrics of controlled air permeability are frequently manufactured from polyamide fibers in the form of filament yarns. A particularly advantageous polyamide fiber is nylon 6.6. However, other synthetic fibers such as polyester fibers have also been found very useful for this purpose.

Industrial fabrics are advantageously manufactured from yarn linear densities of 230–940 dtex. Air bags in particular are made from linear densities of 235, 350 and 470 dtex. The number of individual filaments may be for example 36 in the case of a 235 dtex yarn and 72 in the case of a 350 or 470 dtex yarn.

Preferably, the polyamide yarn employed has a tenacity of at least 60 cN/tex and an elongation of 15–30%. Polyester yarns for this purpose have an elongation of 10–25% as well as a tenacity of at least 60 cN/tex.

Polyamide yarns used for contact fabrics on the one hand and those used for filter fabrics on the other differ in shrinkage. Whereas filter fabrics may be made from yarns having a hot air shrinkage of 2–4% (measured at 190° C.), contact fabrics may be made of yarns having a hot air shrinkage of 7–10% (measured at 190° C.). The difference in shrinkage follows from the different air permeability requirements for filter and contact fabrics. The low air permeability of contact fabrics requires a denser fabric and hence greater relaxation during wet treatment, which necessitates a high shrinkage value to start from.

If polyester filament yarns are used for manufacturing air bag fabrics, the corresponding hot air shrinkage values are preferably 1–4% (measured at 190° C.) for filter fabrics and 5–9% (measured at 190°) for contact fabrics.

To achieve specific air permeability control, the fabrics must be woven with the numbers of threads per cm in warp and weft, accurately adapted to the yarn linear density. For instance, a 470 dtex 72 filament nylon 6.6 yarn with a hot air shrinkage of 2–4% (measured at 190° C.), plain-woven with 16 threads/cm in warp and weft will, under the hereinafter described wet processing and drying conditions, produce an air permeability of about 80 $l/dm^2 \times min$, measured under a test pressure difference of 500 Pa, in the ready-produced fabric. If the thread density of the yarn mentioned is increased to 19/cm in warp and weft and if the hereinafter described conditions are observed, this produces a fabric with an air permeability of about 30 $l/dm^2 \times min$, measured under a test pressure difference of 500 Pa. A 235 dtex 36 filament yarn will give a fabric with an air permeability of about 40 $l/dm^2 \times min$, measured under a test pressure difference of 500 Pa, when the fabric woven has 26 threads/cm in warp and weft. All these details are based on the use of nylon 6.6 yarns having a hot air shrinkage of 2–4% (measured at 190° C.).

The fabrics are preferably plain-woven with a symmetrical set. To achieve an appealing fabric handle, finer linear densities can also be woven in a 2/2 Panama weave with a symmetrical set. For air bag filter fabrics which are to have a relatively high air permeability, it can be advantageous to employ weaves other than the plain weave, resulting in a better seam slippage resistance. Examples are cross twill, Panama or crepe weaves.

A symmetrical fabric set means that the fabric must have at least essentially the same number of threads per cm in warp and weft with the warp and weft threads having at least approximately the same textile properties such as linear density, tenacity, elongation at break and hot air shrinkage. A symmetrical fabric set is a simple way of achieving the demand for equal strength in warp and weft. This demand is made in particular by automotive manufacturers with respect to air bags, since an air bag is a radially symmetrical component without a preferred direction.

The woven fabric according to the invention is subjected to a treatment in an aqueous bath at 60°–140° C. This relaxes the fabric and makes it more dense.

The treatment in the aqueous bath is preferably carried out at 90°–100° C. This temperature range has proved to be very favorable from the aspect of air permeability control. A treatment temperature of 95° C. is particularly preferred. The preferred temperatures have the advantage that the range of available wet processing machinery is less restricted than at temperatures above 100° C.

The treatment in the aqueous bath may be carried out for example on any machine available for open-width washing in textile processing. Open-width washers have proven favorable, but jiggers may also be used for such treatments. At temperatures above 100° C. the treatment can be carried out on an HT jigger, in which case treatment temperatures of up to 140° C. are possible.

This wet treatment also serves to remove any size applied prior to weaving. This is advantageous in order to avoid bacterial infestation during very long storage times of some fabrics, for example of air bags in the steering wheel of a vehicle.

Even in the case of twisted warp yarns, which are normally employed unsized, the treatment in the aqueous bath also serves to remove any spin finish on the yarn from fibermaking.

The specified treatment temperatures apply not only to fabrics made of polyamide yarns but also to fabrics made of polyester yarns.

The wet treatment time and any bath additives to be employed depend on the size/spin finish to be removed and may be determined by those skilled in the art.

In the case of polyester yarns having the above-mentioned properties, the wet process described does not bring about adequate relaxation and fabric densification. Polyester yarn fabrics must be subjected to an additional relaxation treatment with hot air.

There is a fundamental difference here between the further treatment of fabrics made of polyamide yarns and of fabrics made of polyester yarns following the wet treatment. In the case of fabrics made of polyamide yarns, the wet treatment brings about an adequate degree of relaxation, and hence fabric density, for achieving the desired air permeability. Fabrics made of polyester yarns require an additional hot air treatment.

The discussion which follows concerning treatment with hot air relates to fabrics made of polyamide yarns. Fabrics made of polyester yarns must be subjected to different hot air treatment conditions, which will later be described in detail.

Following the wet treatment, polyamide yarn fabrics should be dried without a prolonged storage period in between wet treatment and drying.

The drying is preferably carried out on a stenter. The fabric may be introduced into the stenter with an over feed of 3–5%.

The drying temperature is crucial. It must not exceed 150° C. The best range is 140°–150° C. Higher drying temperatures can bring about a heat-setting of the fabric and an attendant decrease in the air permeability. Close control of this very important property for many industrial fabrics is then no longer ensured.

The drying is preferably carried out on a stenter. The fabric speed is controlled in such a way as to achieve a residence time of about 80 seconds in the stenter. The overfeed at the stenter inlet is 3.5%. On leaving the stenter the fabric must be cooled down gradually, i.e., without use of the cooling fan frequently employed at the stenter outlet. To ensure very gradual cooling down to room temperature, the fabric emerging from the stenter is passed over successive floating rolls.

Following this cooling pass, the moisture content of the fabric should be about 5%.

It is important that, downstream of the stenter, the fabric is wound up at low tension. Good results were obtained with tensions of 150–300 N/m fabric width.

These production conditions result in a fabric which contains its original air permeability even under extreme conditions, i.e., it effectively resists ageing.

For fabrics made of polyester yarns, the wet treatment may be carried out in the same way as for fabrics made of polyamide yarns. Thereafter, polyester yarn fabrics are subjected to a dryer pass, for example on a cylinder dryer or perforated drum dryer at 150° C. Drying is achieved by setting on a stenter at 190° C. The stenter inlet overfeed is about 3%.

As regards cooling conditions, the previous discussion concerning cooling conditions for polyamide yarn fabrics applies, although in the case of polyester fabrics these conditions do not have as pronounced an effect on the ageing resistance as in the case of polyamide fabrics.

Ageing resistance is tested along the lines of tests customarily employed by automotive manufacturers to simulate extreme conditions. In the first stage the fabrics are exposed at a temperature of 105° C. for 100 hours. These fabrics are then subjected to a cyclic temperature treatment for 168 hours (stage 2). First they are stored at 105° C. for 6 hours, which is followed by cooling in the course of an hour to −35° C. The fabric is exposed at −35° C. for a further 6 hours. It is then heated again in the course of an hour to 105° C. and stored at that temperature for 6 hours. As mentioned, the second stage with cycling between very high and very low temperatures in the pattern mentioned took a total of 168 hours. In the third stage the fabric is then stored for a further 168 hours at different temperatures and atmospheric humidities. In this cycle, the fabric is initially exposed to a temperature of 70° C. and a relative humidity of 95% for 6 hours. The conditions are then changed in the course of an hour to a temperature of 20° C. and relative humidity of 30%. Again, the fabric is stored under these conditions for 6 hours. The conditions are then changed back in the course of an hour to a temperature of 70° C. and 95% relative humidity, under which conditions the fabric was again stored for 6 hours, and the treatment patten was then continued as described. Again, the total treatment time for the third stage was 168 hours.

The measurement of the air permeability to assess the ageing resistance is carried out after two weeks' conditioning under standardized conditions (22° C., 65% relative humidity).

The air permeability is tested on the lines of DIN 53 887. The only departure from this DIN standard is to raise the test pressure difference to 500 Pa in order that a clear test signal may be obtained even at low air permeabilities.

As the table below shows, the air permeability of the industrial fabrics manufactured according to the invention remains unchanged even following the extreme ageing conditions described. As the table shows, under these extreme test conditions the air permeability does not differ from the original value by more than 15%, regardless of whether the original air permeability was relatively high, medium or low. Thus, the process according to the invention is suitable for both the manufacture of air bag filter fabrics and air bag contact fabrics. These two kinds of fabric differ in required air permeability.

|  | (Air permeability in $1/dm^2 \times min$) | |
| --- | --- | --- |
|  | immediately following manufacture | following storage under standardized conditions |
| Trial 1 | 107 | 110 |
| Trial 2 | 96 | 97 |
| Trial 3 | 70 | 72 |
| Trial 4 | 93 | 93 |
| Trial 5 | 33.8 | 37.2 |
| Trial 6 | 56.8 | 59.6 |
| Trial 7 | 6.4 | 6.6 |
| Trial 8 | 4.6 | 4.9 |

The trials are carried out with 470 dtex 72 filament nylon 6.6 yarn. Only Trial 8 is carried out with a 350 dtex 72 filament yarn. The shrinkage value (hot air shrinkage, measured at 190° C.) is 3.2% in the case of the yarn used for Trials 1-6; the various air permeability starting levels are produced by varying the numbers of threads per cm and the type of weave. In the case of the yarns for Trial 7, the shrinkage value was 8.2%, and in the case of the yarn for Trial 8, it was 8.7% (each measured at 190° C.).

Thus, industrial fabrics manufactured according to the invention retain their original air permeabilities even during ageing tests under extreme conditions. The industrial fabrics manufactured according to the invention are of particular interest for articles which are employed for protection of life and limb and must function without change in their original properties.

This applies in particular to air bags. The use of the fabric manufactured according to the invention in the filter part of an air bag ensures that the air permeability of the filter fabric remains unchanged, even after a prolonged storage period. For example, in the steering wheel of a vehicle, controlled escape of the generator-produced gas is possible in the event of deployment of the air bag function.

An air bag system which contains an air bag with a filter part and a contact fabric or at least one of these parts formed from the fabric manufactured according to the invention provides safe cushioning of the motor vehicle occupants in the event of an impact. This is guaranteed by such an air bag system even after the motor vehicle has been in use for several years. An air bag system which contains an air bag with a filter part and a contact part formed from the fabric manufactured according to the invention thus offers a high degree of safety for the vehicle occupants, which represents a significant advance over prior art systems.

An air bag system comprises the air bag itself, the accommodation of the air bag in the motor vehicle and the control system for deploying the air bag function.

EXAMPLE 1

This example shows the manufacture of an ageing-resistant fabric of relatively high air permeability as required in filter fabrics for air bags.

470 dtex 72 filament nylon 6.6 yarn is plain-woven. The yarn used has a hot air shrinkage of 3.4% (measured at 190° C.). The thread density is 16/cm in both warp and weft.

The fabric thus produced is then subjected to a wet treatment on a jigger at 95° C. Six treatment passes are carried out on the jigger.

The roller of jiggered fabric is introduced into a stenter at an overfeed of 4%. The drying temperature is 150° C.

The fabric emerging from the stenter is passed over floating rolls to cool it down gradually, without actuation of the cooling fan at the stenter outlet, to room temperature (about 25° C.) and wound up with minimal tension. The residual moisture content of the dried fabric was 4.7%.

The fabric thus manufactured has an air permeability of 78 $1/dm^2 \times min$ under a test pressure difference of 500 Pa.

The fabric is then subjected to the three-stage ageing process described and thereafter stored under standard conditions. Following this treatment the air permeability is 82 $1/dm^2 \times min$, measured under a test pressure difference of 500 Pa.

EXAMPLE 2

Example 1 is repeated with the same starting yarn using a higher number of threads per cm to obtain a lower air permeability. The number of threads used per cm in warp and weft is 18. Other production conditions are not altered.

The resulting fabric has an air permeability of 42 $1/dm^2 \times min$. After the ageing test with subsequent conditioning, the air permeability is 44 $1/dm^2 \times min$. These measurements are obtained under a test pressure difference of 500 Pa.

The other fabric characterization data do not substantially change throughout the ageing test, as shown in the table below. Only tear propagation resistance is found to decrease slightly.

|  | Original value | After Ageing and conditioning |
| --- | --- | --- |
| Threads/cm |  |  |
| Warp | 18.5 | 18.4 |
| Weft | 18.0 | 18.0 |
| Basis weight g/m² | 188.1 | 184.8 |
| Fabric thickness (mm) | 0.304 | 0.303 |
| Ultimate tensile strength (N) |  |  |
| Warp | 2776 | 2810 |
| Weft | 2755 | 2779 |
| Ultimate tensile strength elongation (%) |  |  |
| Warp | 32.5 | 33.1 |
| Weft | 33.8 | 34.8 |
| Tear propagation resistance (N)- trapeze method |  |  |
| Warp | 427.6 | 405.1 |
| Weft | 431.7 | 396.2 |

EXAMPLE 3

Example 1 is repeated with the same starting yarn, except that the plain weave of Example 1 is replaced by a 2/2 twill wave with 21 threads/cm. Other production conditions remained unchanged.

The fabric obtained has an air permeability of 57 l/dm²×min. After ageing and conditioning, the air permeability is 60 l/dm²×min. The measurements obtained are each determined under a test pressure difference of 500 Pa.

The other fabric characterization data do not change, with the exception of a small decrease in the tear propagation resistance, as the following table shows:

|  | Original value | After Ageing and conditioning |
| --- | --- | --- |
| Threads/cm |  |  |
| Warp | 20.8 | 21.2 |
| Weft | 21.2 | 21.5 |
| Basis weight g/m² | 214.3 | 213.7 |
| Fabric thickness (mm) | 0.382 | 0.389 |
| Ultimate tensile strength (N) |  |  |
| Warp | 3138 | 3167 |
| Weft | 3188 | 3218 |
| Ultimate tensile strength elongation (%) |  |  |
| Warp | 32.6 | 34.3 |
| Weft | 31.7 | 32.6 |
| Tear propagation resistance (N)- trapeze method |  |  |
| Warp | 613.1 | 534.6 |
| Weft | 541.9 | 461.7 |

Examples 2 and 3 show that, irrespective of fabric density in terms of the thread density and irrespective of the type of weave, the process of the invention makes it possible to produce fabrics whose air permeability changes only insignificantly even under an extreme test and that the remaining fabric characterization data likewise remain substantially unaffected by this ageing test.

EXAMPLE 4

This example shows that the process of the invention is also highly suitable for manufacturing fabrics having a very low air permeability and is equally suited for manufacturing contact fabrics and filter fabrics for air bags.

In contradistinction to Example 1, a relatively high shrinkage yarn having a hot air shrinkage of 7.2% (measured at 190° C.) is used. In addition, the thread density is increased to 22/cm. Higher hot air shrinkage and increased thread density are designed to produce a denser fabric and hence a lower air permeability. The remaining process data correspond to those of Example 1.

The fabric obtained has an air permeability of 6.4 l/dm²×min. After ageing and conditioning the air permeability is 6.6 l/dm²×min. All the values mentioned were obtained under a test pressure difference of 500 Pa.

Concerning the remaining fabric characterization data, the overall results are similar to that of the other trials:

|  | Original value | After Ageing and conditioning |
| --- | --- | --- |
| Threads/cm |  |  |
| Warp | 22.2 | 22.3 |
| Weft | 21.7 | 21.7 |
| Basis weight g/m² | 246.1 | 245.1 |
| Fabric thickness (mm) | 0.384 | 0.381 |
| Ultimate tensile strength (N) |  |  |
| Warp | 3222 | 3154 |
| Weft | 2832 | 2722 |
| Ultimate tensile strength elongation (%) |  |  |
| Warp | 46.0 | 43.6 |
| Weft | 31.9 | 30.6 |
| Tear propagation resistance (N)- trapeze method |  |  |
| Warp | 436.6 | 395.2 |
| Weft | 458.5 | 377.6 |

EXAMPLE 5

Example 4 is repeated, except that 350 dtex 72 filament yarn is used. Its hot air shrinkage is 6.7% (measured at 190° C.). To compensate for lower yarn linear density, a higher thread density is employed, 25/cm. The remaining process data correspond to those for Example 1 and Example 4.

The fabric obtained has an air permeability of 4.6 l/dm²×min. After ageing and conditioning, the air permeability is 4.9 l/dm²×min. These values are obtained under a test pressure difference of 500 Pa.

As regards the remaining fabric characterization data, again the results are similar to those obtained in the other trials:

|  | Original value | After Ageing and conditioning |
| --- | --- | --- |
| Threads/cm |  |  |
| Warp | 25.6 | 25.8 |
| Weft | 24.6 | 24.8 |
| Basis weight |  |  |

-continued

| | | |
|---|---|---|
| g/m² | 206.8 | 204.5 |
| Fabric thickness (mm) | 0.322 | 0.317 |
| Ultimate tensile strength (N) | | |
| Warp | 2859 | 2795 |
| Weft | 2096 | 2097 |
| Ultimate tensile strength elongation (%) | | |
| Warp | 43.0 | 42.5 |
| Weft | 27.5 | 27.7 |
| Tear propagation resistance (N)- trapeze method | | |
| Warp | 363.9 | 293.5 |
| Weft | 302.2 | 257.4 |

EXAMPLE 6

Example 6 is Example 4, but for the yarn used. The yarn is 235 dtex 36 filament. Its hot air shrinkage is 6.4% (measured at 190° C.). To compensate for lower yarn linear density, a higher thread density is used, 30/cm. The remaining process data correspond to those for Example 1 and Example 4.

The fabric obtained has an air permeability of 7.4 l/dm²×min. Following ageing and conditioning, the air permeability is 7.5 l/dm²×min. These values mentioned are obtained under a test pressure difference of 500 Pa.

Concerning the remaining fabric characterization data, again the results are similar to those obtained in the other trials:

| | Original value | After Ageing and conditioning |
|---|---|---|
| Threads/cm | | |
| Warp | 30.8 | 30.8 |
| Weft | 29.1 | 29.1 |
| Basis weight g/m² | 165.7 | 165.3 |
| Fabric thickness (mm) | 0.258 | 0.250 |
| Ultimate tensile strength (N) | | |
| Warp | 2075 | 2089 |
| Weft | 1945 | 1993 |
| Ultimate tensile strength elongation (%) | | |
| Warp | 39.6 | 40.2 |
| Weft | 29.7 | 30.4 |
| Tear propagation resistance (N)- trapeze method | | |
| Warp | 251.0 | 212.7 |
| Weft | 224.6 | 185.2 |

EXAMPLE 7

This example describes an exemplary manufacture of polyester filament yarn filter fabrics, prepared in accordance with the invention, and useful in airbags.

A 550 dtex 96 filament polyester yarn is plain-woven. The yarn used has a hot air shrinkage of 2.7% (measured at 190° C.). The thread density is 16/cm in both warp and weft.

The fabric thus produced is then subjected to a wet treatment on a jigger at 95° C. Six treatment passes are carried out on the jigger.

The roll of jiggered fabric is cylinder dried at 150° C. The fabric is then stenter-set at 190° C. The stenter inlet overfeed is 3%.

The fabric emerging from the stenter is cooled in the same way as in Example 1, i.e., without actuation of the cooling fan at the stenter outlet, by passing over floating rolls at room temperature (about 25° C.). Again the fabric is wound up with minimal tension.

The fabric thus produced has an air permeability of 43 l/dm²×min under a test pressure difference of 500 Pa.

The fabric is then subjected to the three-stage ageing process described. At the end of the total treatment time and conditioning, the air permeability is found to be 44 l/dm²×min. In all cases the air permeability is measured under a test pressure difference of 500 Pa.

What is claimed is:

1. An industrial woven fabric having a controlled air permeability <120 l/dm²×min, measured under a test pressure difference of 500 Pa, and high ageing-resistance, wherein the air permeability does not change by more than 15% from its original value after storage at very high and very low temperatures or after storage at very high and very low atmospheric humidities, and wherein the fabric is made of a yarn having a hot air shrinkage of less than 9% at about 190° C.

2. The fabric according to claim 1, wherein the fabric is made of a synthetic filament yarn.

3. The fabric according to claim 2, wherein the synthetic filament yarn is a polyamide yarn having a shrinkage of about 2-4% at about 190° C.

4. An industrial woven fabric having a controlled air permeability <120 l/dm²×min, measured under a test pressure difference of 500 Pa, and high ageing-resistance, wherein the air permeability does not change by more than 15% from its original value after storage at very high and very low temperatures or after storage at very high and very low atmospheric humidities, and wherein the fabric is made of a polyester yarn.

5. The fabric according to claim 1, wherein the very high temperature is about 105° C. and the very low temperature is about −35° C.

6. The fabric according to claim 1, wherein the very high atmospheric humidity is about 95% and the very low atmospheric humidity is about 30%.

7. An air bag comprised of an industrial woven fabric having a controlled air permeability <120 l/dm²×min, measured under a test pressure difference of 500 Pa, and high ageing-resistance, wherein the air permeability does not change by more than 15% from its original value after storage at very high and very low temperatures or after storage at very high and very low atmospheric humidities, and wherein the fabric is made of a yarn having a hot air shrinkage of less than 9% at about 190° C.

8. The air bag according to claim 7, wherein the fabric comprises a filter part of the air bag.

9. The airbag according to claim 7, wherein the fabric is made of a yarn having a hot air shrinkage of less than 6% at about 90° C.

10. Air bag system comprising an air bag according to claim 7.

11. The fabric according to claim 1, wherein the fabric is made of a yarn having a hot air shrinkage of less than 6% of about 190° C.

12. The fabric according to claim 4, wherein the polyester yarn has a hot air shrinkage of about 1-4% at about 190° C.

13. The fabric according to claim 4, wherein the polyester yarn has a hot air shrinkage of about 5-9% at about 190° C.

14. The fabric according to claim 4, wherein the polyester yarn has a tenacity of at least 60 cN/tex and an elongation of about 10-25%.

15. An airbag comprised of the fabric according to claim 3.

16. An airbag comprised of the fabric according to claim 12.

17. An airbag comprised of the fabric according to claim 13.

18. An airbag comprised of the fabric according to claim 14.

19. A process for manufacturing industrial fabrics of controlled air permeability <120 1/dm$^2$×min, measured under a test pressure difference of 500 Pa, comprising: subjecting a fabric, made of synthetic filament yarn having a hot air shrinkage adapted to the air permeability to be achieved and having a thread density accurately adapted to yarn linear density and the air permeability to be achieved, to a wet treatment in an aqueous bath at a temperature of 60°-140° C.; then treating the fabric in at least one hot air stage, the last hot air treatment always taking place on a stenter; and then gradually cooling the fabric after the stenter treatment; and winding the fabric with minimal tension.

20. The process according to claim 19, wherein the fabric is made of polyamide filament yarn and subjecting the fabric to the wet treatment causes relaxation, further comprising: feeding the fabric into a stenter after wet treatment at an overfeed of 3-5%; drying the fabric in the stenter at a temperature of not more than 150° C.; slowly cooling the fabric without a fan at the stenter outlet; winding up the fabric at minimal tension; and setting drying and cooling conditions in such a way that a moisture content of the fabric is about 5% at wind-up.

21. The process according to claim 19, wherein the fabric is made of a polyester yarn, and after subjecting the fabric to the wet treatment, the fabric is subsequently dried and set in a stenter at a temperature of about 190° C., gradually cooled after the stenter treatment and wound up with low tension.

22. The process according to claim 19, further comprising:

selecting a type of synthetic filament yarn, having a predetermined yarn linear density, for constructing the fabric; and treating the fabric in the at least one hot air stage according to the type of synthetic filament yarn selected.

23. The process according to claim 20, further comprising passing the fabric emerging from the stenter over successive floating rolls.

24. The process of claim 20, wherein the polyamide filament yarn has a hot air shrinkage of less than 9% at about 190° C.

25. The process of claim 20, wherein the polyamide filament yarn has a hot air shrinkage of less than 6% at about 190° C.

26. The process of claim 21, wherein the polyester yarn has a hot air shrinkage of less than 10% at about 190° C.

27. The process of claim 21, wherein the fabric is gradually cooled without a fan after the stenter treatment.

* * * * *

UNITED STATES PATENT AND TRADEMARK OFFICE
CERTIFICATE OF CORRECTION

PATENT NO. : 5,356,680
DATED : October 18, 1994
INVENTOR(S) : Wolf R. Krummheuer, Hans A. Graefe and Volker Siejak It is certified that error appears in the above-identified patent and that said Letters Patent is hereby corrected as shown below:

Column 2, line 56, change "190°)" to --190°C)--.

Column 4, line 18, change "over" to --over- --.

Column 5, line 11, change "patten" to --pattern--.

Column 7, line 28, change "wave" to --weave--.

Column 10, Claim 11, line 3, change "of" to --at--.

Signed and Sealed this

Twenty-fourth Day of January, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,356,680
DATED : October 18, 1994
INVENTOR(S) : Wolf R. KRUMMHEUER et al.

It is certified that error appears in the above-indentified patent and that said Letters Patent is hereby corrected as shown below:

Claim 9, col. 10, line 60, change "90°C." to --190°C.--.

Signed and Sealed this

Twenty-eight Day of February, 1995

Attest:

BRUCE LEHMAN

Attesting Officer    Commissioner of Patents and Trademarks